United States Patent
Gouzenne Coutier (10) Patent No.: US 10,371,072 B2
(45) Date of Patent: Aug. 6, 2019

(54) METHOD AND DEVICE FOR DETECTING REVERSE ROTATION OF AN INTERNAL COMBUSTION ENGINE

(71) Applicants: CONTINENTAL AUTOMOTIVE FRANCE, Toulouse (FR); CONTINENTAL AUTOMOTIVE GMBH, Hannover (DE)

(72) Inventor: Valerie Gouzenne Coutier, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 95 days.

(21) Appl. No.: 15/562,166

(22) PCT Filed: Apr. 14, 2016

(86) PCT No.: PCT/EP2016/000613
§ 371 (c)(1),
(2) Date: Sep. 27, 2017

(87) PCT Pub. No.: WO2016/165829
PCT Pub. Date: Oct. 20, 2016

(65) Prior Publication Data
US 2018/0080395 A1    Mar. 22, 2018

(30) Foreign Application Priority Data
Apr. 16, 2015 (FR) .................................. 1553394

(51) Int. Cl.
| | | |
|---|---|---|
| G01M 15/06 | (2006.01) | |
| F02D 41/00 | (2006.01) | |
| F02D 41/22 | (2006.01) | |
| F02D 41/04 | (2006.01) | |
| G01P 3/481 | (2006.01) | |
| G01P 13/04 | (2006.01) | |

(52) U.S. Cl.
CPC ....... F02D 41/009 (2013.01); F02D 41/0097 (2013.01); F02D 41/04 (2013.01);
(Continued)

(58) Field of Classification Search
CPC ..................................................... G01M 15/06
(Continued)

(56) References Cited

U.S. PATENT DOCUMENTS 4,356,447 A   10/1982   Hoenig et al.
7,159,571 B2   1/2007   Kassner
(Continued)

FOREIGN PATENT DOCUMENTS

CN    1820134    8/2006
CN    1957172    5/2007
(Continued)

OTHER PUBLICATIONS

International Search Report, dated Jul. 15, 2016, from corresponding PCT/EP2016/000613 application.

*Primary Examiner* — Eric S. McCall
(74) *Attorney, Agent, or Firm* — Young & Thompson (57) ABSTRACT

A toothed target rotationally fixed to a shaft of the engine includes a series of n real teeth, followed by m dummy teeth forming a reference zone. For each tooth k, the period of time separating the latter from the preceding tooth k−1 is measured. A signal exhibits at least one transition in level in a portion of the signal corresponding to the passage of the reference zone. A first and a second product are calculated for at least some of the values of k; the ratio between these two products is calculated; and the direction of rotation of the engine is detected, in case of correspondence of the ratio with a first noteworthy value and with a second noteworthy value which are representative, respectively, of rotation in a normal direction and rotation in a reverse direction.

20 Claims, 4 Drawing Sheets

(52) U.S. Cl.
CPC ............ *F02D 41/22* (2013.01); *F02D 41/042* (2013.01); *F02D 2041/0095* (2013.01); *F02D 2200/101* (2013.01); *F02D 2250/06* (2013.01); *G01P 3/481* (2013.01); *G01P 13/045* (2013.01); *Y02T 10/40* (2013.01)

(58) Field of Classification Search
USPC ...................................................... 73/114.26
See application file for complete search history.

(56) References Cited

U.S. PATENT DOCUMENTS

| | | | |
|---|---|---|---|
| 7,185,628 B1 | 3/2007 | Holm et al. | |
| 8,589,053 B2 * | 11/2013 | Keiner | F02D 41/02 701/103 |
| 2008/0158039 A1 | 7/2008 | Kassner | |
| 2008/0236265 A1 * | 10/2008 | Dian | F02D 41/009 73/114.26 |
| 2013/0030755 A1 | 1/2013 | Zouboff et al. | |
| 2014/0336878 A1 | 11/2014 | Yanai et al. | |
| 2018/0031594 A1 * | 2/2018 | Joseph | F02D 41/009 |

FOREIGN PATENT DOCUMENTS

| | | |
|---|---|---|
| CN | 101875369 | 11/2010 |
| CN | 103868450 | 6/2014 |
| CN | 104364501 | 2/2015 |
| FR | 2 910 960 A1 | 7/2008 |
| KR | 20100002121 | 1/2010 |
| WO | WO0238936 | 5/2002 |

* cited by examiner

FIG.6B

METHOD AND DEVICE FOR DETECTING REVERSE ROTATION OF AN INTERNAL COMBUSTION ENGINE The present invention relates in a general manner to synchronization techniques in an internal combustion engine, and more particularly concerns a method and a device for detecting reverse rotation of such an engine. The term "reverse rotation" is understood as meaning rotation of the engine in the reverse direction to the normal direction of rotation.

The invention finds applications in particular in the automotive field. It may be implemented, for example, in an engine control computer, such as an injection and/or ignition controller.

In order to enable synchronization of injection and/or ignition in an internal combustion engine, or any heat engine, the engine crankshaft may be equipped with a rotating target collaborating with a fixed sensor associated with processing electronics of the signal of the sensor. These electronics may comprise hardware elements and/or software elements. They are adapted and configured to precisely determine the angular position of the crankshaft, and thus the positions of the pistons of the engine, based on the signal of the sensor.

The rotating target is for example a toothed wheel, joined in rotation with the crankshaft. Such a target contains a large number of teeth, generally 36 or 60 teeth, not counting one or two missing teeth allowing an angular reference zone to be defined on the target.

More particularly, the angular position of the engine is determined by the processing electronics by counting the number of teeth of the target that are "seen" by the sensor since the last passage of the angular reference zone in front of the sensor. From an electrical standpoint, the passing by a flank of a tooth of the target in front of the sensor translates into an edge of the sensor signal, namely a rising edge or a falling edge depending on the arrangement and the technology of the sensor. An increment in the angular position of the crankshaft counted by the processing electronics corresponds to each of these edges. This angular increment is equal to 10 degrees for a target having 36 teeth, or 6 degrees for a target having 60 teeth, for example.

There are cases of usage in which the internal combustion engine may be unintentionally driven in reverse rotation for a considerable time. This may happen, for example during the production phase, when the vehicle is transferred from one zone to another in the factory manufacturing the vehicle. This may also be because of the user, who may let his or her vehicle roll back on a slope while a gear is engaged and the clutch is engaged.

It is desirable to suppress faults in the engine control computer associated with the crankshaft which are currently encountered in the cases of usage described above.

Reverse rotation of the engine may be detected with a specific type of sensor, capable of providing information relating to the direction of rotation in addition to information relating to passage of a tooth of the target in front of the sensor. There are two types of sensors of this kind, which are in widespread use in the current state of the art.

On the one hand there are which are referred to as "voltage pulse" sensors, that supply a pulse of fixed length which is characteristic of the direction of rotation, for example a pulse of 45 picoseconds (ps) for a crankshaft tooth seen in the normal direction of rotation, or a pulse of 90 ps for a crankshaft tooth seen in the reverse direction of rotation.

On the other hand, there are which are referred to as "voltage level" sensors, that supply a different voltage according to the direction of rotation of the engine, for example a voltage of 5 volts (V) for a crankshaft tooth seen in the normal direction of rotation, or a voltage of 2.5 V for a crankshaft tooth seen in the reverse direction of rotation.

A sensor of either of the two types above therefore directly supplies information relating to the direction of rotation. This information may then be used by the engine control computer, for example to avoid any injection and/or to avoid false detection of a fault.

Moreover, the document U.S. Pat. No. 7,185,628 teaches that detection of reverse rotation is sometimes equally possible by identifying and correlating signals emitted by a sensor associated with the crankshaft and a sensor associated with the camshaft, respectively.

Finally, there are strategies making it possible to detect that an engine which was previously rotating in the normal direction has just moved to reverse rotation, in the case of the engine stalling, for example.

However, the abovementioned specific types of sensors providing detection of the direction of rotation are generally more costly than normal sensors which allow only detection of the passage of each tooth of the target. Moreover, not all applications are therefore provided with such sensors. The other techniques mentioned above are not usable either in all applications, or else involve a greater cost, and/or are not efficient in all situations, depending on the engine speed, for example.

The invention aims to eliminate, or at least lessen, some or all of the abovementioned drawbacks in the prior art, by providing an alternative to the known solutions given above. In particular, the invention makes it possible to detect that a heat engine is turning in reverse rotation, without the use of any information other than that of the crankshaft sensor signal generated by a standard type of sensor associated with the crankshaft.

To this end, a first aspect of the invention provides a method for detecting the direction of rotation of an internal combustion engine, the engine being associated with:
 a toothed target rotationally fixed to a shaft of the engine, said toothed target comprising a series of teeth comprising on the one hand n real teeth which are regularly spaced, followed by m dummy teeth forming a reference zone on the other hand, where n and m are non-zero integers;
 a sensor arranged to generate a substantially periodic sensor signal having active edges between a first signal level and a second signal level in response to the passage of the real teeth of the toothed target in front of said sensor; and
 a management unit configured to measure, for each tooth of index k in the series of teeth, the period of time, referred to as the period $T(k)$ of the tooth k, separating said tooth k from the preceding tooth of index k−1 in the series of teeth. The sensor signal further exhibits at least one transition between the first signal level and the second signal level in a portion of the sensor signal corresponding to passage of the reference zone (32) of the toothed target in front of the sensor.

The method comprises the following steps executed for at least some of the values of the index k associated with the teeth of the target:
 a) calculation of a first product by multiplying N times the period $T(k-N/2)$ of the tooth $k-N/2$, where N is an even integer equal to or greater than 2, b) calculation of a second product by multiplying between themselves the periods T(k−i) of the teeth i, with i being between 0 and N/2−1, and between N/2+1 and N, c) calculation of the ratio, denoted R'(k), between the first product and the second product, and d) detection of the direction of rotation of the target, and therefore of the engine, in case of correspondence of the ratio R'(k) with a first noteworthy value and with a second noteworthy value which are representative, respectively, of rotation in a normal direction of rotation and of rotation in a reverse direction of rotation to said normal direction of rotation.

Expressed in mathematical terms, the ratio R'(k) is such that:

$$R'(k) = \left[ \frac{\left(T\left(k-\frac{N}{2}\right)\right)^N}{\prod_{i}^{\frac{N}{2}+1 \ldots N} T(k-i) \times \prod_{i}^{0 \ldots \frac{N}{2}-1} T(k-i)} \right]$$

The strategy makes it possible to ensure detection of reverse rotation based solely on a standard sensor signal, for example associated with the crankshaft. There is no need to use a specific type of sensor or to generate additional information. Nor is there any need for correlation between a signal originating from the camshaft and a signal originating from the crankshaft such as described in the prior art illustrated by the abovementioned document U.S. Pat. No. 7,185,628.

One constraint lies solely in the fact that the sensor signal must exhibit the abovementioned transition between the high and low levels.

According to modes of embodiment of the invention, taken alone or in combination, furthermore:

N being equal to 2, the first noteworthy value of the sensor signal is equal to 9;

the transition of the sensor signal between the first signal level and the second signal level in the portion of the sensor signal corresponding to passage of the reference zone of the toothed target in front of the sensor is such that a duty cycle of the sensor signal in said portion of the sensor signal is between 30% and 70% for rotation of the target in the forward direction of rotation;

N being equal to 2 and the duty cycle of the sensor signal in the portion of the sensor signal being substantially equal to 50% for rotation of the target in the forward direction of rotation, the second noteworthy value of the sensor signal is equal to 4;

the number n is equal to 58 and the number m is equal to 2; and/or the steps a) to d) are carried out for all values of the index k associated with the teeth of the target; and in this case the method may comprise determining, from the ratio R'(k), information representative of the position of the tooth of index k in relation to the reference zone;

or otherwise the steps a) to d) may be carried out for only some of the values of the index k associated with the teeth of the target, for which the value k=m.

A second aspect of the invention relates to an electronic device comprising means for implementing each of the steps of a processing method according to the first aspect above.

According to a third aspect, the invention further relates to a system for managing an internal combustion engine, comprising:

a toothed target rotationally fixed to a shaft of the engine, said toothed target comprising a series of teeth comprising on the one hand n real teeth which are regularly spaced, followed by m dummy teeth forming a reference zone on the other hand, where n and m are non-zero integers;

a sensor arranged to generate a substantially periodic sensor signal having active edges between a first signal level and a second signal level in response to the passage of the real teeth of the toothed target in front of said sensor; and a management unit configured to measure, for each tooth of index k in the series of teeth, the period of time, referred to as the period T(k) of the tooth k, separating said tooth k from the preceding tooth of index k−1 in the series of teeth; and a device according to the second aspect above.

In modes of embodiment, the device may be included in the management unit.

Other features and advantages of the invention will become more apparent on reading the following description. This description is purely illustrative and must be read in the light of the appended drawings in which.

An internal combustion engine, for example for an automobile, comprises at least one movable piston arranged in such a way as to cause a variation in the volume of a combustion chamber. Gas intake and exhaust to/from the combustion chambers is most often achieved with the aid of valves controlled by at least one camshaft. The energy generated in the combustion chambers by combustion of a fuel in a combustive is transmitted by each piston to a drive shaft referred to as a crankshaft.

Synchronizing an internal combustion engine consists of precisely identifying the positions of the moving parts (piston, crankshaft, camshaft etc.) and also the point in time in the engine cycle (whether the latter be a two-stroke or four-stroke engine). This allows the on-board electronics to control operation of the engine, especially in regard to injection of the fuel or the fuel mixture and in regard to ignition (for controlled ignition engines), with the correctness and precision required to achieve optimum operation.

Synchronization methods make use of algorithms making it possible to determine the position of the engine as a function of the angular position of the crankshaft and/or camshaft of the engine, detected by sensors installed in the engine. These sensors cooperate with rotating targets which are rotationally fixed to the crankshaft and to the camshaft, respectively, for example toothed wheels.

The method for detecting reverse rotation of the engine may advantageously employ, at least in part, corresponding hardware and software means, especially the rotating target, the associated sensor, and the processing electronics.

The example of processing of a signal of a rotation sensor for an engine crankshaft will be considered more particularly below. This example is of course not limiting. The invention may equally be applied to processing of a signal of a rotation sensor for any rotary shaft connected to the engine, in particular an engine camshaft or a gearbox shaft coupled to the engine.

Figure 1:
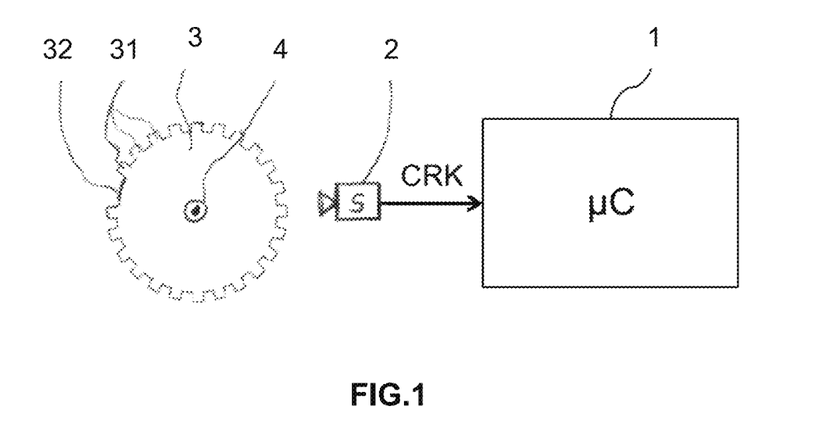
FIG. 1 is a functional diagram showing the arrangement of a rotating target, of a sensor for rotation of the rotating target, and of an electronic unit for processing the sensor signal comprising a first comparator and a second comparator according to modes of embodiment.

An example of application of the invention to an injection controller and/or an ignition controller in an internal combustion engine of an automobile will be considered with reference to the functional diagram in FIG. 1.

The controller 1 may be realized in the form of a microcontroller (μC), which may be a circuit integrated into a specific application ("Application Specific Integrated Circuit" (ASIC)), a system on a chip ("System-on-Chip" (SoC)), a programmable logic circuit or programmable logic array ("Field Programmable Gate Array" (FPGA)), etc. The invention is not however limited to these examples, and it is possible for the controller to form part of a more complex item of equipment, comprising for example an arrangement of several integrated circuits including computers, memories and peripherals, etc.

The microcontroller 1 comprises hardware elements, such as analog-digital converters, drivers, input/output filters, etc., and software elements.

The device according to modes of embodiment of the invention may be provided within this microcontroller, as will now be described.

To this end, the microcontroller 1 comprises an input 14 for receiving a sensor signal CRK, provided by a rotation sensor 2.

The sensor 2 is for example positioned in a fixed manner in proximity to a rotating target 3, such as a toothed wheel, with which it cooperates to generate the signal CRK. The term "toothed wheel" should be understood in its most generally accepted meaning, i.e., a wheel comprising structural elements allowing a sensor to identify rotation of the wheel over a given angular sector. The nature and the arrangement of these structural elements may vary. They may involve geometric shapes such as teeth in the literal sense thereof, magnetic elements such as magnetic poles, or optical elements or elements identifiable by an optoelectronic device, etc.

For convenience in the example depicted in FIG. 1, the toothed wheel 3 comprises 24 teeth 31 which are regularly spaced on the periphery of the wheel except within a reference zone 32 where one tooth is missing. In this example therefore, the number n of real teeth is equal to 23 (n=23) and the number m of dummy teeth is equal to 1 (m=1). With this example, the angular increment is approximately 15°. In practice, however, and as mentioned in the introduction, a target which is conventionally used comprises rather 36 or 60 teeth (without taking account of the fact that one or more teeth are missing in the reference zone), giving an angular increment of 10 or 6°, respectively.

The toothed wheel 3 is rotationally fixed to a movable shaft 4, namely the crankshaft of the engine in the example considered here.

The microcontroller 1 comprises elements, especially software elements, configured to control synchronization of the engine from the sensor signal CRK originating from the sensor 2.

In principle, an internal combustion engine always rotates in the same direction, referred to as the normal direction of rotation. It may be the case, however, that the engine is unintentionally driven in the reverse direction to the normal direction of rotation, as was indicated in the introduction. This is then referred to as reverse rotation of the engine.

It is desirable to suppress faults in the engine control computer associated with the crankshaft which are currently encountered in cases of reverse rotation of the engine.

Figure 2:
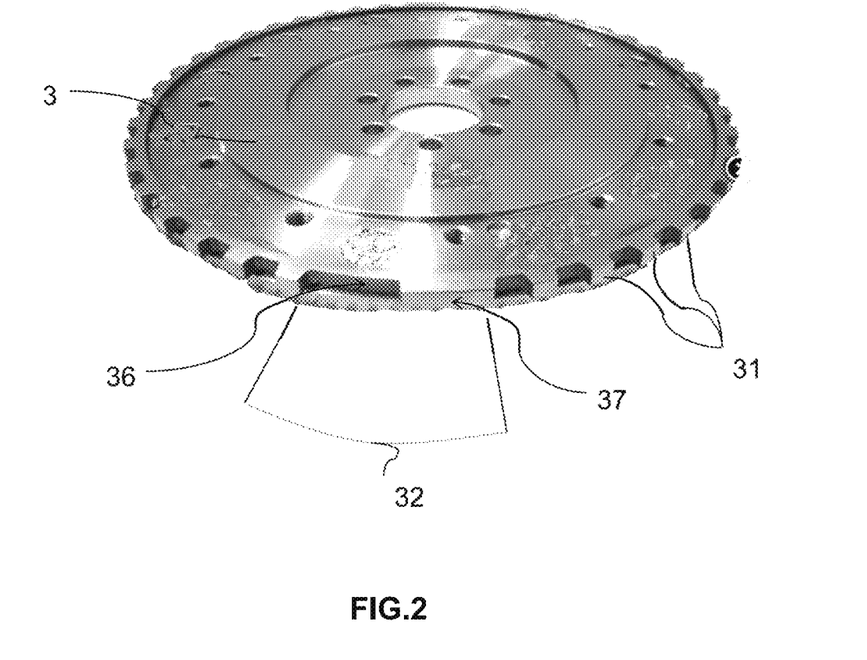
FIG. 2 is a three-dimensional view of a toothed target comprising a reference zone according to modes of embodiment.

Referring to FIG. 2, the rotating target 3 may be a toothed wheel for example having a diameter equal to 255 millimeters (mm), having at the periphery thereof a series of teeth comprising on the one hand n real teeth which are regularly spaced, followed by m dummy teeth forming a reference zone 32 on the other hand, where n and m are non-zero integers.

In one example, each of the n real teeth 31 has a projecting portion having a width (measured along an external circumference of the target 3) equal to 5 mm followed by a recessed portion having a width equal to 8.5 mm.

The series of real teeth is interrupted in the reference zone 32 of the target. According to a singularity of the construction of the target, a number m of teeth are replaced therein, these teeth therefore being referred to as "dummy teeth".

Conventionally, the singularity of the target in the reference zone consists of a recessed portion having the same depth as the recesses of the real teeth, the width of which corresponds to the width of the m dummy teeth.

As a variant, the singularity is sometimes, conversely, a projecting portion having the same height as the real teeth, the width of which corresponds for example to the width of the m dummy teeth.

In the modes of embodiment of the invention illustrated in FIG. 2, the singularity of the target in the reference zone 32 consists of at least one recessed portion 36 and at least one projecting portion 37 which are alternated, and the depth of which and the height of which, respectively, correspond for example to the depth and the height of the real teeth 31. In one example, the recessed portion may have a width equal to mm, and the projecting portion may have a width equal to 18 mm. The cumulative width of these portions corresponds to the width of the m dummy teeth in the reference zone 32.

Figure 3A:
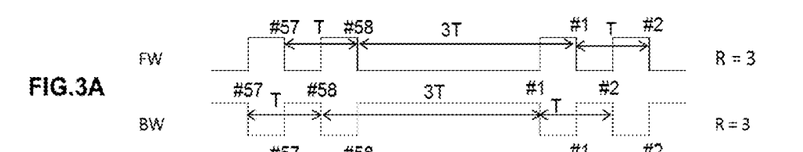
FIGS. 3A and 3B are timing lines showing the appearance, as a function of time, of a low-level sensor signal and a high-level sensor signal, respectively, during the passage of the reference zone in front of the sensor, each time for a normal direction of rotation (top timing line) and for a reverse direction of rotation (bottom timing line)
Figure 3B:
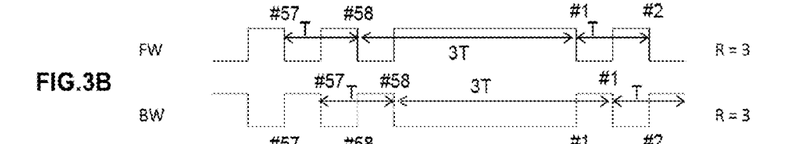
Figure 3C:
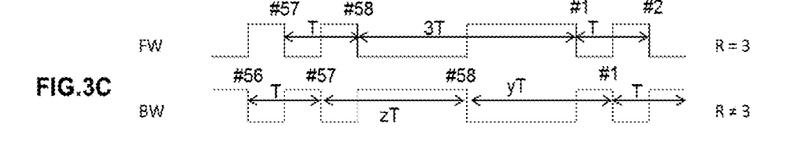
FIG. 3C is a timing line showing the appearance, as a function of time, of a sensor signal associated with the toothed target in FIG. 2, exhibiting a transition in level during the passage of the reference zone in front of the sensor, for a normal direction of rotation (top timing line) and for a reverse direction of rotation (bottom timing line)

The timing lines in FIG. 3A-3C show the appearance of the sensor signal CRK for targets having a singularity corresponding to the cases mentioned above. The signal portions shown in these figures correspond to the passage of the reference zone in front of the sensor, and also of a number of real teeth preceding the reference zone, and also of a number of real teeth following said reference zone.

By convention, the direction of rotation corresponding to the direction of rotation of the engine during normal operation will be referred to as the forward rotation direction (or FW, from the word "Forward"). The reverse direction of rotation will be referred to as the backward rotation direction (or BW, from the word "Backward"). In FIG. 3A-3C, the normal or forward rotation direction corresponds to displacement of the teeth from left to right, and is illustrated each time by the timing line at the top. Conversely, the reverse or backward rotation direction corresponds to displacement of the teeth from right to left, and is illustrated each time by the timing line at the bottom.

Also by convention, the real tooth of rank k in the series of n real teeth 31 of the target 3 will be denoted by the letter k preceded by a hash symbol, i.e., by the symbols #k with k varying from 1 to n. In the timing lines in FIG. 3A-3C, these symbols are arranged above the active edge of the signal CRK generated by the passage of the tooth of index k in front of the sensor.

In the example such as illustrated by FIG. 3A-3C, the active edges of the signal CRK are the falling edges, through which the signal CRK passes from high level to low level, i.e. from high voltage (for example 5 V) to low voltage (for example 0 V). The invention is not however limited to this example, since the management unit 1 may, as a variant, be adapted to react to the rising edges of the signal CRK, through which the signal CKR passes from low level to high level.

In the example illustrated by the appended drawings and described in the present description, the total number n+m of real and dummy teeth of the target is equal to 60. Moreover, the number n of real teeth being equal to 58 (n=58) and the number m of dummy teeth in the reference zone 32 being equal to 2 (m=2).

In other modes of embodiment which are not depicted, the number m may be greater than 2, which gives better performance in detecting the direction of rotation. The higher m is, however, the more the quality of the sensor signal serving as the clock signal CRK is degraded, due to the fact that the regular edges of the signal are not detected during the passage of the reference zone in front of the sensor. In other words, the higher the number of dummy teeth, the greater the increase in the zone of inaccuracy of the angular position of the engine.

By detecting the passage of the n real teeth of the target in front of the sensor, it is possible to determine in real time the angular position of the crankshaft and the instantaneous speed of rotation thereof. These items of information are then used to control injection of fuel into the cylinders of the engine or ignition of the spark plugs.

The sensor 2 in FIG. 1 gives a result in the form of a signal such as depicted in FIG. 3A-3C: when one of the n real teeth of the target passes in front of the sensor, the signal exhibits a transition between one and the other of the high and low levels, followed by an inverse transition. At each falling edge (but the same operating logic may be applied to each rising edge) of the sensor signal, a counter is incremented in the management unit 1 in order to count the teeth detected by the sensor and to deduce therefrom the angular position of the crankshaft. More particularly, the angular position of the crankshaft is defined by the number of teeth counted from the reference zone.

The instantaneous angular position of the crankshaft is thus determined by calculating the difference between the instantaneous value of the counter and the value of the counter at the moment of detection of the last reference zone. More particularly, the angular position of the crankshaft is thus the angular value corresponding to this difference.

As for the reference zone, it is detected by measuring the period of time elapsing between two successive real teeth.

In all the modes of embodiment, the sensor signal exhibits at least one transition between the first signal level and the second signal level in a portion of the sensor signal corresponding to the passage of the reference zone 32 of the toothed target in front of the sensor, as illustrated by the timing lines in FIG. 3C. The ratio between the duration of the portion of the signal CRK in which the signal is in the high state, for example, and the sum of said duration and of the duration of the following portion of the signal in which the signal is in the low state is referred to as the duty cycle T of the signal CRK in the reference zone.

For example, the duty cycle of the sensor signal in the portion of said signal corresponding to the passage of the reference zone 32 of the toothed target in front of the sensor may be defined for rotation of the target in the forward rotation direction.

In the example shown in FIG. 3C, the sensor signal thus has a duty cycle equal to 50% in the reference zone. For example, the mechanical target exhibits an equivalence of the length of plateaus at a high and low level with a low level, as shown in FIG. 2. This is only an example, however, the modes of embodiment not being limited to this value of the duty cycle. A duty cycle of between 30% and 70%, or indeed between 40% and 60%, is preferable for performance in detecting the direction of rotation.

The value of the duty cycle T may for example be selected as a function of the ratio between the number n of dummy teeth in the reference zone and the total number n+m of teeth of the target, but it will be noted that there is no single ideal value, since the detection performance also depends on the engine speed.

The management unit 1 is configured to measure, for each tooth of index k in the series of n teeth, the period of time, referred to as the period T(k) of the tooth k, separating said tooth k from the preceding tooth of index k−1 in the series of teeth. In the same way, the period T(k−1) of the tooth k−1 is the duration separating said tooth k−1 from the preceding tooth of index k−2 in the series of teeth, and so on.

Outside of the reference zone 32, the period T(k) is equal to a constant duration T, which depends solely on the engine speed. The ratio R(k) of the duration T(k) to the duration T(k−1) is thus equal to 1 [R(k)=1] for the teeth of index k, for k greater than 2 and equal to or less than n (2<k<n).

In the reference zone, and for a rotation of the engine in the normal direction FW, the ratio R is equal to 3 (R=3). It is in fact equal to the ratio of T(1) to T(58). This is illustrated by the timing lines at the top of FIG. 3A-3C.

Still in the reference zone, but this time for a rotation of the engine in the reverse direction BW, the ratio R(k) in the reference zone is equal to the ratio of T(58) to T(1). It is also equal to 3 [R(k)=3] for the sensor signals depicted in the timing lines at the bottom of FIGS. 3A and 3B, which correspond to the case of a signal at a constant level during the passage of the reference zone 32 in front of the sensor 2. However, the ratio R(k) is different from 3 [R(k)≠3] in the case illustrated by the timing line at the bottom of FIG. 3C, in which the sensor signal exhibits a transition between a first signal level and the other signal level in the portion corresponding to the passage of the reference zone 32 in front of the sensor 2. The duration between successive edges of the signal CRK may be equal to yT or zT, where y and z are real positive numbers other than one.

It follows that, as long as the sensor signal CRK exhibits a transition in level in the portion thereof corresponding to the passage of the reference zone in front of the sensor, the rotation direction of the target may be detected by monitoring the value of the ratio R(k).

Thus, for example, in the modes of embodiment where n is equal to two (n=2), if R(k) is equal to three or to one third [i.e., when R(k)=3 or when R(k)=⅓] when it is not equal to one [i.e., when R(k)≠1], it is the case that the target, and therefore the engine, are turning in the normal direction. This case is illustrated, for modes of embodiment where n is equal to two (n=2), by the timing line in FIG. 4A in which it can be seen that R(k)=3 for the tooth #1 (that is to say, for k=1) and that R(k)=⅓ for the tooth #2 (that is to say, for k=2).

If, on the other hand, R(k) is equal to a value other than three or one third [i.e., if R(k)≠3 and R(k)≠⅓] when it is not equal to one [i.e., when R(k)≠1], it is the case that the target, and therefore the engine, are turning in the reverse direction. This case is illustrated by the timing line in FIG. 4B, still for modes of embodiment where n is equal to two (n=2). In the mode of embodiment in FIG. 4B, it can be seen that z=1.6 and y=2.4. Thus:

R(k)=2.4 for tooth #58, that is to say for k=58;
R(k)=1.6/2.4 for tooth #57, that is to say for k=57; and
R(k)=1/1.6 for tooth #56, that is to say for k=56.

Figure 4A:
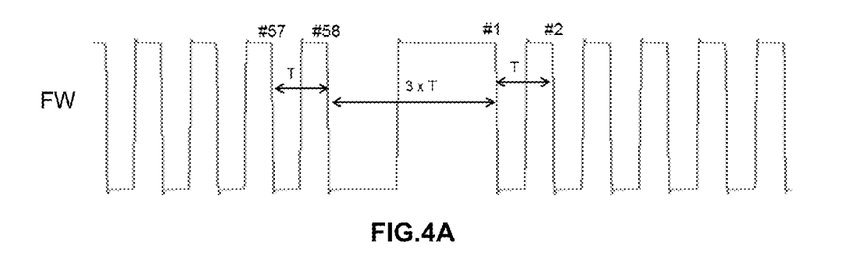
FIGS. 4A and 4B are timing lines comparable with that at the top of FIG. 3C and with that at the bottom of FIG. 3C, respectively, illustrating the ratio R(k) of the duration T(k) separating said tooth k from the preceding tooth of index k−1 in the series of teeth to the duration T(k−1) separating said tooth k−1 from the preceding tooth of index k−2 in the series of teeth.
Figure 4B:
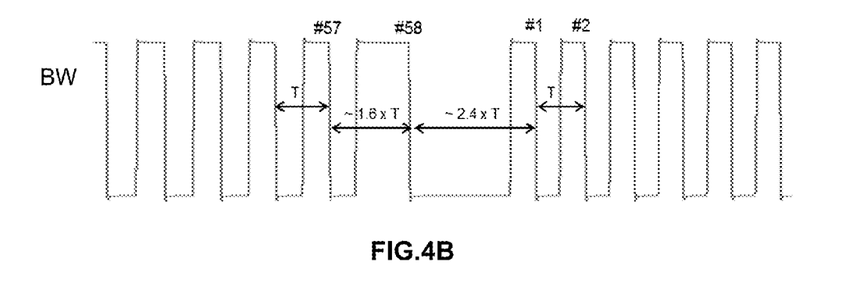

However, it may prove difficult to distinguish, at all engine speeds, one of the values above which correspond to the case in FIG. 4B, on the one hand, and the value 3 or the value ⅓ which correspond to the case in FIG. 4A, on the other hand. In particular, acceleration or deceleration phases may give rise to false detections of reverse rotation of the target, or may on the contrary mask real situations of reverse rotation.

This is why the modes of embodiment of the method for detecting the direction of rotation of the target which are provided here make another use of the ratio R'(k) which was disclosed in the document FR 2 978 542 for determining information representative of the position of a real tooth of a toothed target rotationally fixed to a shaft of an internal combustion engine.

The abovementioned ratio R'(k) is given to the order N by the expression below:

$$R'(k) = \left[ \frac{\left(T\left(k - \frac{N}{2}\right)\right)^N}{\prod_{i}^{\frac{N}{2}+1 \ldots N} T(k-i) \times \prod_{i}^{0 \ldots \frac{N}{2}-1} T(k-i)} \right] \quad \text{Formula (1)}$$

where N is an even integer equal to or greater than 2.

More particularly, the method comprises the following steps executed for at least some of the values of the index k associated with the teeth of the target, for example for k=2 when n=2, or successively for the values of k corresponding to the angular zone of the target around the reference zone, or else successively for all the values of k (i.e., for k being between 1 and n):

a) calculation of a first product by multiplying N times the period T(k−N/2) of the tooth k−N/2, b) calculation of a second product by multiplying between themselves the periods T(k−i) of the teeth i, with i being between 0 and N/2−1, and between N/2+1 and N, c) calculation of the ratio, denoted R'(k), between the first product and the second product, and d) detection of the direction of rotation of the target, and therefore of the engine, in case of the ratio R'(k) being substantially identical to a first noteworthy value and to a second noteworthy value which are representative, respectively, of rotation in a normal direction of rotation and of rotation in a reverse direction of rotation to said normal direction of rotation.

In one mode of embodiment where N is equal to 2 (N=2), n is equal to 58 (n=58), m is equal to 2 (m=2) and the duty cycle T is equal to 50%, the first noteworthy value of the sensor signal is equal to 9, and the second noteworthy value of the sensor signal is equal to 4. The invention is not limited to this example, however. It may thus be applied to modes of embodiment in which N, n, m, n+m and/or T have different values to those given above, in which case the first and second noteworthy values may be different to 9 and 4, respectively.

In practice, the correspondence of the values of the ratio R'(k) with the first and second noteworthy values is not necessarily considered as an identical relationship, at least not an absolutely identical relationship. On the contrary, this correspondence is determined if a relationship of proximity with the noteworthy values is satisfied. For example, the values of the ratio R'(k) are compared with one or more thresholds around the first and second noteworthy values, and it is considered that the ratio R'(k) corresponds to one or other of the noteworthy values if criteria of position in relation to these thresholds are fulfilled. More particularly, for first and second noteworthy values of 9 and 4 in the example considered here, the thresholds may be equal to 3.5 and 7, for example: if R'(k)>7 then the processing electronics determine that R'(k) corresponds to the first noteworthy value which means that the target is rotating in the normal direction; and if 3.5<R'(k)<7 then the processing electronics determine that R'(k) corresponds to the second noteworthy value which means that the target is rotating in the reverse direction.

Equally, it is known that R'(k)=1 for values of k between 3 and n (n=58 in the example), that is to say, for normal teeth remote from the reference zone, and that only m (m=2 in the example) consecutive values of R'(k) are greater than 1, in fact for the teeth coming just after the reference zone. The processing electronics may therefore equally take account of a repetition, since the values of R'(k) correspond to one or other of the noteworthy values, this repetition in fact corresponding to a periodicity which coincides with the number of turns accomplished by the target. For example, the correspondence of the values of R'(k) with one or other of the noteworthy values may have to be repeated over several consecutive turns of the target in order to be considered as validly detected.

Figure 5:
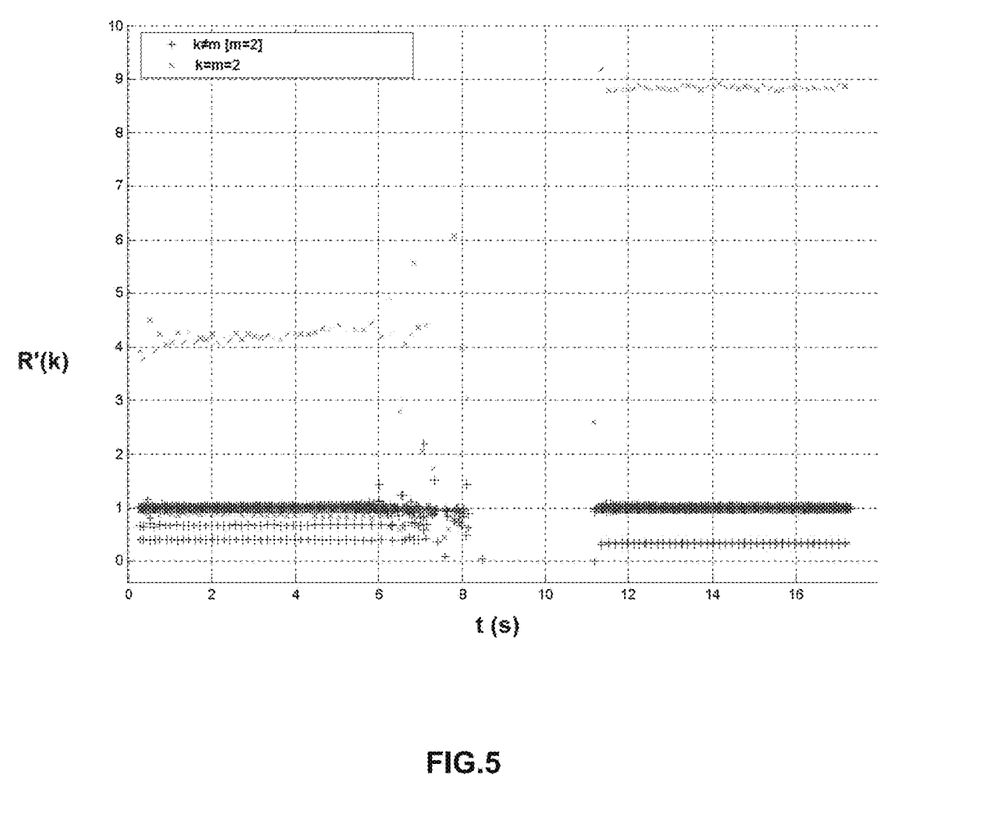
FIG. 5 is a timing line of the values of a second-order quadratic ratio R'(k), respectively at each edge of the sensor signal, for rotation of the engine in the reverse direction and for rotation in the normal direction.

The timing line in FIG. 5 gives the values calculated by the formula (1) above, respectively at each edge of the sensor signal, in the case of the example considered here. These values are represented on the y-axis, as a function of time t indicated on the x-axis, by a cross ("x") for the edges of the sensor signal associated with the tooth #2, and by a plus sign ("+") for the other edges. It can be seen that, around the reference zone and more particularly for the tooth #2, the value R'(k) with k=2 is around 4 (more particularly, it is overall slightly above 4) for rotation in the reverse direction, i.e., for t being between 0 and 8 s in FIG. 5; and it is close to 9 (by lower values) for rotation in the normal direction, i.e. for t being between 11 and 17 seconds in FIG. 5.

A priori, however, it will be noted that the first noteworthy value, which corresponds to detection of rotation in the normal direction (namely 9 in the example above), does not depend on the duty cycle T of the sensor signal CRK in the reference zone.

On the other hand, the first noteworthy value, which corresponds to detection of rotation in the reverse direction (namely 4 in the example above), depends on the duty cycle T of the sensor signal CRK in the reference zone. In one mode of embodiment in which N is equal to 2 and in which the duty cycle T of the sensor signal in the portion of the sensor signal corresponding to passage of the reference zone in front of the sensor being substantially equal to 50% for rotation of the target in the forward rotation direction, the second noteworthy value of the sensor signal is equal to 4.

Figure 6A:
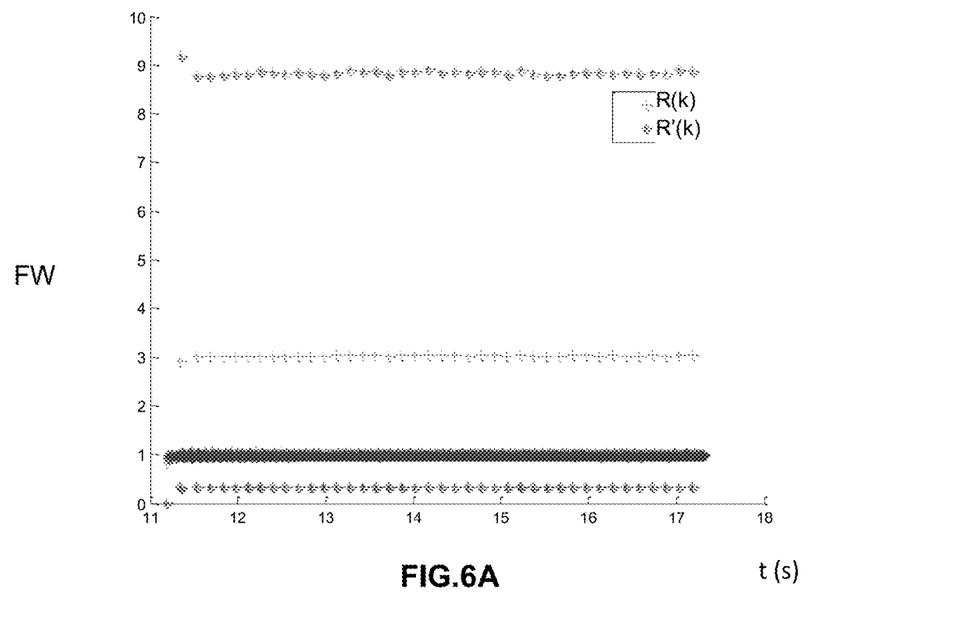
FIGS. 6A and 6B are timing lines enabling a comparison of the values of the ratio R'(k) with values of the ratio R(k), respectively for rotation of the target in the forward direction and rotation in the reverse direction.
Figure 6B:
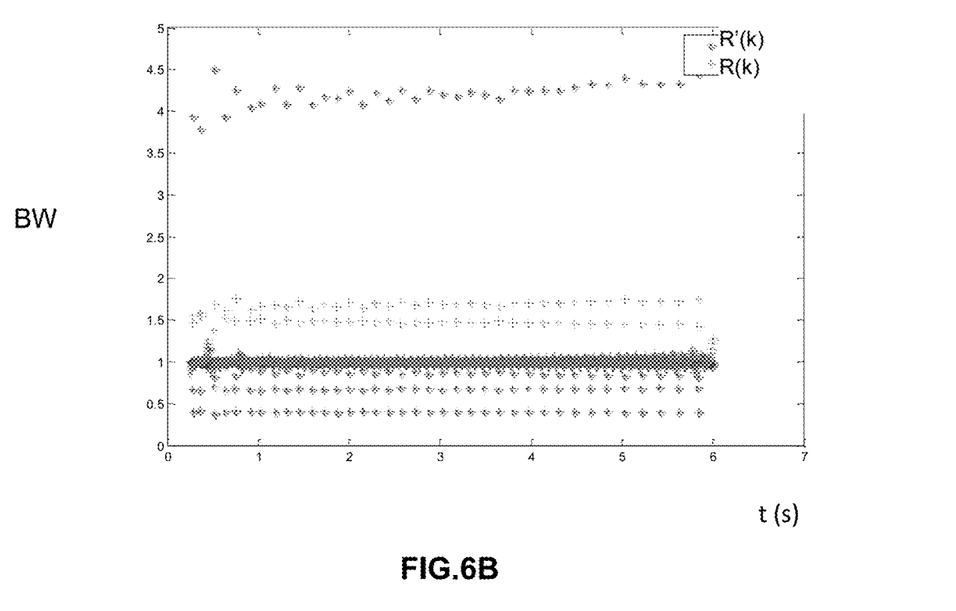

Each of the timing lines in FIGS. 6A and 6B shows, as a function of time t indicated on the x-axis, the values of R(k) represented on the y-axis by a plus sign ("+") and the values of R'(k) represented on the y-axis by a star ("*") for the other edges.

FIGS. 6A and 6B show the advantage of using values of the ratio R'(k) in comparison with values of the ratio R(k), respectively in the case of rotation of the target in the forward direction (FW) and in the case of rotation in the reverse direction (BW). Specifically, it can be seen that the values of R'(k) given in one and the other case are easier to distinguish than the values of R(k).

In modes of implementation, the method comprises determining, also from the ratio R'(k), information representative of the position of the tooth of index k in relation to the reference zone, as described in the document FR 2 978 542. The calculation of the values of R'(k) is thus carried out only once for each value of k but is used to fulfil two separate functions: on the one hand, determining the angular position of the target (and possibly the speed of rotation thereof, by derivation in relation to time) as described in the document FR 2 978 542, and on the other hand, detection of the normal or reverse direction of rotation of the target in accordance with the modes of embodiment given in the present description. In these modes of embodiment, the ratio R'(k) is calculated successively for all the values of k (i.e., for k being between 1 and n).

In other modes of embodiment, the ratio R'(k) is calculated successively for all the values of k (i.e., for k being between 1 and n), even if it is not used to generate information representative of the position of the tooth of index k in relation to the reference zone as was described in the paragraph above. Specifically, in these modes of embodiment, the control electronics may be unaware of the angular position of the target, such that they are unaware of which edges among those detected by the sensor correspond to passage of the reference zone in front of the latter.

It can be seen, however, through the numerical examples given in the preceding examples and in which m=2, that the most significant deviation between the value of R'(k) which corresponds to rotation in the normal direction and the value of R'(k) which corresponds to rotation in the reverse direction, is obtained for the tooth #m, that is to say for k=2 in this example and for k=m in the general case, regardless of the order N of the ratio R'(k). This is why, if it is possible to distinguish the edge corresponding to passage of the tooth #k, it is possible to simply calculate the ratio R'(k) for k=m. The performance for detecting the direction of rotation is in fact best for this value of R'(k).

The present invention was described and illustrated in the present detailed description and in the figures. The present invention is not limited to the forms of embodiment given above. Other variants and modes of embodiment may be derived and implemented by a person skilled in the art on reading the present description and the appended figures.

In the claims, the term "comprise" does not exclude other elements or other steps. A single processor or several other units may be used in order to implement the invention. The different features given and/or claimed may be advantageously combined. The presence thereof in the description or in the different dependent claims does not exclude this possibility. The reference signs should not be understood as limiting the scope of the invention.

The invention claimed is:

1. A method for detecting the direction of rotation of an internal combustion engine, said engine being associated with:
  a toothed target (3) rotationally fixed to a shaft (4) of the engine, said toothed target comprising a series of teeth comprising on the one hand n real teeth (31) which are regularly spaced, followed by m dummy teeth forming a reference zone (32) on the other hand, where n and m are non-zero integers;
  a sensor (2) arranged to generate a substantially periodic sensor signal having active edges between a first signal level and a second signal level in response to the passage of the real teeth of the toothed target in front of said sensor; and
  a management unit (1) configured to measure, for each tooth of index k in the series of teeth, the period of time, referred to as the period T(k) of the tooth k, separating said tooth k from the preceding tooth of index k−1 in the series of teeth; wherein,
  the sensor signal further exhibiting at least one transition between the first signal level and the second signal level in a portion of the sensor signal corresponding to passage of the reference zone (32) of the toothed target in front of the sensor, the method comprises the following steps executed for at least some of the values of the index k associated with the teeth of the target:
  a) calculation of a first product by multiplying N times the period T(k−N/2) of the tooth k−N/2, where N is an even integer equal to or greater than 2,
  b) calculation of a second product by multiplying between themselves the periods T(k−i) of the teeth i, with i being between 0 and N/2−1, and between N/2+1 and N,
  c) calculation of the ratio, denoted R'(k), between the first product and the second product, and
  d) detection of the direction of rotation of the target, and therefore of the engine, in case of correspondence of the ratio R'(k) with a first noteworthy value and with a second noteworthy value which are representative, respectively, of rotation in a normal direction of rotation and of rotation in a reverse direction of rotation to said normal direction of rotation.

2. The method as claimed in claim 1, wherein, N being equal to 2, the first noteworthy value of the sensor signal is equal to 9.

3. The method as claimed in claim 1, wherein the transition of the sensor signal between the first signal level and the second signal level in the portion of said sensor signal corresponding to passage of the reference zone (32) of the toothed target in front of the sensor is such that a duty cycle of the sensor signal in said portion of the sensor signal is between 30% and 70% for rotation of the target in the forward direction of rotation.

4. The method as claimed in claim 3, wherein, N being equal to 2 and the duty cycle of the sensor signal in said portion of the sensor signal being substantially equal to 50% for rotation of the target in the forward direction of rotation, the second noteworthy value of the sensor signal is equal to 4.

5. The method as claimed in claim 1, wherein the number n is equal to 58 and the number m is equal to 2.

6. The method as claimed in claim 1, wherein the steps a) to d) are carried out for all values of the index k associated with the teeth of the target.

7. The method as claimed in claim 6, comprising determining, from the ratio R'(k), information representative of the position of the tooth of index k in relation to the reference zone.

8. The method as claimed in claim 1, wherein the steps a) to d) are carried out for only some of the values of the index k associated with the teeth of the target, for which the value k=m.

9. A device comprising means for implementing each of the steps of a processing method as claimed in claim 1.

10. A system for managing an internal combustion engine, comprising:
- a toothed target (3) rotationally fixed to a shaft (4) of the engine, said toothed target comprising a series of teeth comprising on the one hand n real teeth (31) which are regularly spaced, followed by m dummy teeth forming a reference zone (32) on the other hand, where n and m are non-zero integers;
- a sensor (2) arranged to generate a substantially periodic sensor signal having active edges between a first signal level and a second signal level in response to the passage of the real teeth of the toothed target in front of said sensor; and
- a management unit (1) configured to measure, for each tooth of index k in the series of teeth, the period of time, referred to as the period T(k) of the tooth k, separating said tooth k from the preceding tooth of index k−1 in the series of teeth; and
- a device as claimed in claim 9.

11. The system as claimed in claim 10, wherein the device is included in the management unit (1).

12. The method as claimed in claim 2, wherein the transition of the sensor signal between the first signal level and the second signal level in the portion of said sensor signal corresponding to passage of the reference zone (32) of the toothed target in front of the sensor is such that a duty cycle of the sensor signal in said portion of the sensor signal is between 30% and 70% for rotation of the target in the forward direction of rotation.

13. The method as claimed in claim 2, wherein the number n is equal to 58 and the number m is equal to 2.

14. The method as claimed in claim 3, wherein the number n is equal to 58 and the number m is equal to 2.

15. The method as claimed in claim 4, wherein the number n is equal to 58 and the number m is equal to 2.

16. The method as claimed in claim 2, wherein the steps a) to d) are carried out for all values of the index k associated with the teeth of the target.

17. The method as claimed in claim 3, wherein the steps a) to d) are carried out for all values of the index k associated with the teeth of the target.

18. The method as claimed in claim 4, wherein the steps a) to d) are carried out for all values of the index k associated with the teeth of the target.

19. The method as claimed in claim 5, wherein the steps a) to d) are carried out for all values of the index k associated with the teeth of the target.

20. The method as claimed in claim 2, wherein the steps a) to d) are carried out for only some of the values of the index k associated with the teeth of the target, for which the value k=m.

* * * * *